United States Patent [19]

Yamamoto et al.

[11] Patent Number: 5,275,986
[45] Date of Patent: Jan. 4, 1994

[54] SILICON NITRIDE SINTERED BODY

[75] Inventors: Takehisa Yamamoto; Takao Nishioka; Tomoyuki Awazu; Akira Yamakawa, all of Itami, Japan

[73] Assignee: Sumitomo Electric Industries, Ltd., Japan

[21] Appl. No.: 941,659

[22] Filed: Sep. 8, 1992

[30] Foreign Application Priority Data

Nov. 25, 1991 [JP] Japan ................... 3-309010

[51] Int. Cl.$^5$ .............................................. C04B 35/58
[52] U.S. Cl. ........................................ 501/98; 501/97
[58] Field of Search ................................ 501/98, 97

[56] References Cited

U.S. PATENT DOCUMENTS

| | | | |
|---|---|---|---|
| 4,383,958 | 5/1983 | Moschetti et al. | 501/98 |
| 4,506,020 | 3/1985 | Butler et al. | 501/98 |
| 4,618,592 | 10/1986 | Kuramoto et al. | 501/98 |
| 4,826,791 | 5/1989 | Mehrotra et al. | 501/98 |
| 4,830,991 | 5/1989 | Matsui | 501/98 |
| 4,834,982 | 5/1989 | Su | 501/98 |
| 4,886,767 | 12/1989 | Goto et al. | 501/98 |
| 5,045,513 | 9/1991 | Mizuno et al. | 501/98 |
| 5,081,079 | 1/1992 | Ukyo et al. | 501/98 |

FOREIGN PATENT DOCUMENTS

| | | | |
|---|---|---|---|
| 48-38448 | 11/1973 | Japan | C04B 35/58 |
| 49-21091 | 5/1974 | Japan | C04B 35/58 |
| 61-91065 | 5/1986 | Japan | C04B 35/58 |
| 2-44066 | 2/1990 | Japan | C04B 35/58 |

OTHER PUBLICATIONS

Mitomo, *Strengthening of Silicon Nitride Ceramics*, 1989, pp. 27–32, *Kogyo* 21, No. 12.

Mitomo et al, *Sintering Behavior of Si$_3$N$_4$ with Y$_2$O$_3$ and Al$_2$O$_3$ Addition*, pp. 96–101, 1986, Ceramic Society 94(1).

Richerson, *Effect of Impurities on the High Temperature Properties of Hot Pressed Silicon Nitride*, AM. Ceramic Bulletin 52, 1973, pp. 560'562.

*Primary Examiner*—Karl Group
*Assistant Examiner*—Deborah Jones
*Attorney, Agent, or Firm*—Jordan B. Bierman

[57] ABSTRACT

A silicon nitride sintered body comprising α-silicon nitride including α'-sialon and β'-sialon including β-silicon nitride in which the content of the α-silicon nitride including α'-sialon in the surface part thereof is less than its content in the inner part thereof. The silicon nitride sintered body is excellent in mechanical strength at ordinary temperature, productivity and cost efficiency.

2 Claims, No Drawings

SILICON NITRIDE SINTERED BODY

BACKGROUND OF THE INVENTION

1. Field of the Invention

The present invention relates to a silicon nitride sintered body having excellent mechanical strengths especially at ordinary temperature and excellent in productivity and cost efficiency.

2. Description of the Prior Art

Various research and development have heretofore been made on the sintering process, sintering aid, restriction of constituent crystal phases and the like for the purpose of enhancing the strength of silicon nitride-based materials. For example, with regard to the sintering process, a sintered body having a bending strength as high as 100 kg mm² has been embodied by the hot press sintering process (see Am. Ceram. Soc. Bull., 52 (1973), p.560), and also the hot isostatic press (HIP) process using a glass capsule has been developed. However, these processes cannot be thought to be excellent in productivity and cost efficiency, though excellent strength characteristics of a sintered body can be achieved by them. On the other hand, the gas pressure sintering process can cope with such a problem [see, for example, Mitomo, Funtai to Kogyo 21 (12), 27 (1989)]. However, since in the above process the densification of final sintered product is accompanied by the growth of β-silicon nitride grain, thereby increasing the possibility of causing deterioration in strength due to coarse grain precipitation, and the sintering is carried out usually under a nitrogen gas pressure of 10 atm or higher, the process usually requires large sintering equipment as is the cases with the hot press process and HIP process, thus failing to render itself excellent in characteristics and productivity. Regarding sintering aids, there is disclosed an $Si_3N_4$-$Al_2O_3$-$Y_2O_3$-based silicon nitride sintered body using $Y_2O_3$ as the principal sintering aid in Japanese Patent Publication Nos. 49-21091 and 48-38448. As described in the specifications of the above published patents, it is believed that β-silicon nitride grains form a fibrous structure in the sintered body and the structure is dispersed in the matrix, thus enhancing the strength and toughness of the sintered body itself. Specifically, in the aforestated sinter, the fact that β-silicon nitride crystal is hexagonal and anisotropically grows in the direction of C-axis is positively utilized. As indicated in the Japanese Patent Publication No. 48-38448 and J. Ceramic Soc. Japan 94, p96 (1986), fibrous β-silicon nitride grains sometimes grow by ten-odd μm or larger in the C-axis direction. The above-mentioned sinter, however, still has a possibility that the grain growth causes the abnormal growth, the occurrence of pores or the deterioration of the strength of the sinter. Moreover, the above sintered body using the sintering aid only cannot be sufficiently densified unless the sintering temperature is raised to 1700° to 1900° C., and sometimes stable sintered products cannot be obtained owing to the sublimation and decomposition of silicon nitride in the case of the nitrogen gas pressure sintering around atmospheric pressure. Accordingly, the above sintered body cannot be said to be sufficiently excellent in the characteristics and productivity. According to any of the above-mentioned sintering processes, the strength of the obtained sintered body is approximately 100 kg/mm² at the most expressed in terms of 3-point bending strength, for example, in accordance with JIS R-1601. Thus, considering a variety of applications of silicon nitride-based materials, sufficient characteristics of the materials have not been attained.

SUMMARY OF THE INVENTION

It is an object of the present invention to provide a method of simultaneously satisfying both the productivity and mechanical characteristics of the sinter, which has not been attained with the prior art.

The present invention is based on the finding that a silicon nitride sintered body comprising α-silicon nitride including α'-sialon and β'-sialon including β-silicon nitride, in which the content of the α-silicon nitride including α'-sialon in the surface part thereof is less than the content of the α-silicon nitride including α'-sialon in the inner part thereof, is readily featured by the bending strength of 130 kg/mm² or more expressed in terms of 3-point bending strength in accordance with JIS R-1601. The effect of the excellent characteristic strength of the sintered body according to the present invention enhances the Young's modulus and hardness thereof as compared with the conventional sintered body composed only of the crystal phase of columnar β'-sialon including β-silicon nitride by compounding at a high density both the crystal phases of equiaxed fine crystal grains of α-silicon nitride including α'-sialon having an average grain size of 0.5 μm or smaller and columnar fine grains of β'-sialon having average grain sizes of 2.5 μm or smaller in the major axis direction and 0.5 μm or smaller in the minor axis direction. Young's modulus and hardness are physical properties indicative of the deformation resistance of a material, and an increase in the values thereof leads to an increase in strength in a wide sense for brittle materials such as ceramics. Following Griffith's theory showing the basic concept for the destruction of brittle materials, the destruction strength of a sinter, σf, is represented by the following formula:

$$\sigma f = E \gamma s / 4a$$

where
E: Young's modulus
γs: surface energy of destruction
a: length of crack.

Since γs is considered to be dependent on the composition and thickness of the grain boundary phase, grain refining and crystal phase complexing each enhancing the grain distribution density are advantageous especially with regard to thickness. According to the above formula, in order to improve the destruction strength, importance is attached to an increase in the "E" value and a decrease in the "a" value. Since the "a" value depends on the grain size, if the defective dimension inevitable in the working step is excluded, the present invention in which the density is enhanced with fine grains is effective in improving the strength of the sintered body from the aspect of the "E" and "γs" values. In addition, the content of α-silicon nitride including α'-sialon in the surface part of the sintered body which is less than that in the inner part thereof is considered to increase the destructive toughness in the surface part and the Young's modulus along with the hardness in the inner part, thus leading to an increase in the total strength of the material.

The idea of complexing both the crystal phases of α-silicon nitride and columnar β-silicon nitride is disclosed, for example, in Japanese Patent Laid-Open Nos. 61-91065 and 2-44066. However, the idea is limited to the combination of the crystal phase of $\alpha'$-sialon represented by the general formula: $M_x(Si,Al)_{12}(O,N)_{16}$ wherein M is Mg, Ca, Li or a rare earth element with the crystal phase of $\beta'$-sialon including $\beta$-silicon nitride, and the composition mainly comprises a ternary system $Si_3N_4$-AlN-MO, wherein M is MgO, $Y_2O_3$, CaO or the like. Specifically, the above-mentioned idea is intended to improve the mechanical properties such as strength by forming the complexed crystal phases of $\alpha'$-sialon and $\beta'$-sialon with the limited annexing of AlN/MO of 1:9 by mole, but no mention is made of the AlN/MO ratio in the sinter. Moreover, as can be clearly seen from the working examples therein, the process for producing the sintered body consistently having a strength characteristic of more than 100 kg mm$^2$ expressed in terms of bending strength depends on the hot press process, thus failing to achieve high characteristic strength on a stable industrial scale. In contrast, the present invention provides a sintered body having high strength on a stable industrial scale without such limitation.

DETAILED DESCRIPTION OF THE PREFERRED EMBODIMENTS

In order to obtain the sintered body of the present invention, it is desirable that sintering be effected at a sintering temperature of 1650° C. or lower by the use of a sintering aid capable of forming liquid phase along with $SiO_2$ present on the surface of silicon nitride at a lowest possible temperature, which sintering aid is exemplified by MgO, $CeO_2$, CaO, $La_2O_3$ and SrO. Such low temperature sintering can inhibit the deterioration of the properties of the sintered body accompanying abnormal grain growth. Since silicon nitride sublimates and decomposes in the temperature region of 1700° C. and higher in an atmosphere of nitrogen ($N_2$) under atmospheric pressure, it is necessary to carry out sintering in an atmosphere of pressurized nitrogen, and therefore a batchwise sintering furnace has been employed. However, if the sintering at such a low temperature is made possible, a sintering process excellent in productivity using an open type continuous sintering furnace of pusher system or belt system is also made possible. In more detail, as the process for sintering a silicon nitride-based material excellent in strength characteristics, the gas pressure sintering process with a so-called batch-wise sintering furnace is generally predominant, which process however inevitably causes unevenness in temperature distribution in the furnace and scattering of operational conditions among the different lots. After all, the above-mentioned batchwise process cannot be satisfactory as the process for stably supplying ceramic materials to be used as mass-produced parts or the like. In view of the above, the present invention is of industrial importance in that the sintered body is improved in the productivity simultaneously with the strength thereof.

In order to distinguish the effect of the present invention, it is desirable that the ratio of the crystal phase of $\alpha$-silicon nitride including $\alpha'$-sialon to the crystal phase of $\beta'$-sialon including $\beta$-silicon nitride in the sintered body satisfy the following relation in terms of peak intensity ratio by X-ray diffraction:

0% < $\alpha$-silicon nitride including $\alpha'$-sialon/($\alpha$-silicon nitride including $\alpha'$-sialon + $\beta'$-silicon nitride including $\beta$-silicon nitride) ≤ 50%.

When the precipitation ratio of $\alpha$-silicon nitride including $\alpha'$-sialon exceeds 50% and shifts to a higher $\alpha$-$Si_3N_4$ region, the effect of the columnar structure of $\beta'$-sialon including $\beta$-silicon nitride decreases, resulting in insufficient effects of the complexing of the crystal phases and improvement in strength.

The high strength of the sintered body is stabilized by adjusting the grain boundary phase to be in the range of $0 < Z < 1.0$ in the general formula $Si_{6-z}Al_zO_zN_{8-z}$ for $\beta'$-sialon on the surface part of the sintered body within the aforestated compositional range.

EXAMPLE

A silicon nitride powder having an average grain size of 0.5 μm, an $\alpha$-crystallinity of 96% and an oxygen content of 1.4% by weight and the powders of $Y_2O_3$, $Al_2O_3$, AlN and MgO having an average grain size of 0.8 μm, 0.4 μm, 0.5 μm and 0.2 μm, respectively, were wet-mixed in ethanol for 100 hours in a ball mill made of nylon and then dried. The resultant dried powder mixture was molded by the CIP (cold isostatic press) process at 300 kg/cm$^2$ and the resultant molding was subjected to primary sintering in a nitrogen gas of 1 atm at 1750° C. for 5 to 10 hours. The sintered body thus obtained was subjected to secondary sintering in an atmosphere of nitrogen gas of 100 atm at about 1750° C. for 1 hour. By cutting off the resultant sinter, test pieces for bending test each having a size of 3 mm×4 mm×40 mm according to JIS R-1601 were prepared, ground and finished with a #800 diamond wheel. The tensile surfaces of the test pieces were subjected to lapping with #3000 diamond paste. The finished test pieces were subjected to the 3-point bending strength test in a lot of 15 pieces according to JIS R-1601. The average grain size, ratio of crystal phases and bending strength are given in Table 1.

The ratio of $\alpha$-silicon nitride crystal phase including $\alpha'$-sialon to $\beta'$-sialon crystal phase including $\beta$-silicon nitride on the surface of the sintered body was calculated from the ratio of peak intensity of X-ray diffraction. The ratio of the above two types of crystal phases for the inner part of the sintered body was obtained in the same manner by changing the grinding allowance on the surface of the test piece.

TABLE 1

| No. | Ratio of crystal phases $\alpha$-type/($\alpha$-type + $\beta$-type)** | | 3-point bending strength (kg/mm$^2$) |
|---|---|---|---|
| | surface | inner part | |
| 1 | 43 | 50 | 135.2 |
| 2 | 12 | 20 | 157.5 |
| 3 | 21 | 35 | 148.2 |
| 4 | 3 | 12 | 165.4 |
| 5 | 28 | 43 | 138.7 |
| *6 | 0 | 0 | 85.6 |
| *7 | 60 | 70 | 76.4 |
| *8 | 15 | 10 | 88.6 |
| *9 | 10 | 10 | 68.3 |

*Comparative example
**$\alpha$-type: $\alpha$-silicon nitride crystal phase including $\alpha'$-sialon
$\beta'$-type: $\beta'$-sialon crystal phase including $\beta$-silicon nitride Preferably the sintered body has an oxygen content at the surface down to a depth of 0.5–50 μm that is higher than that in the interior thereof.

The present invention can provide a silicon nitride sintered body excellent not only in mechanical strength at ordinary temperature but also in productivity and cost efficiency.

What is claimed is:

1. A silicon nitride sintered body comprising α-silicon nitride including α'-sialon and β'-sialon including β-silicon nitride, wherein the content of said α-silicon nitride including α'-sialon on the surface of said sintered body is less than that in the interior thereof, the average grain size of said α-silicon nitride including α'-sialon being 0.5 μm or less, and the average grain size of said β'-sialon, including β-silicon nitride, in the major axis direction and minor axis direction being less than or equal to 2.5 μm and 0.5 μm, respectively.

2. The silicon nitride sintered body according to claim 1, in which said sintered body has a surface having a higher content of oxygen at the depth of 0.5 to 50 μm from the surface thereof than the oxygen content in the inner part thereof.

* * * * *